Jan. 4, 1966   A. G. STIMSON ET AL   3,227,057

CAMERA BATTERY TEST INDICATOR

Original Filed March 18, 1963   2 Sheets-Sheet 1

Raymond E. Unterborn
Allen G. Stimson
INVENTORS

BY R. Frank Smith
Eugene S. Stephens
ATTORNEYS

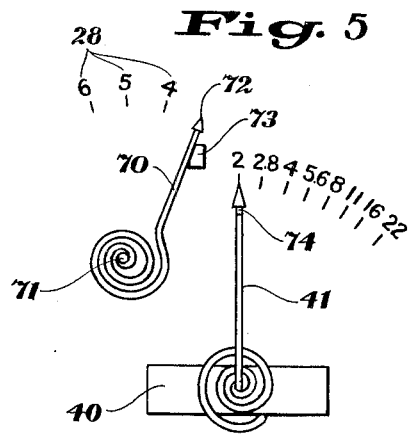
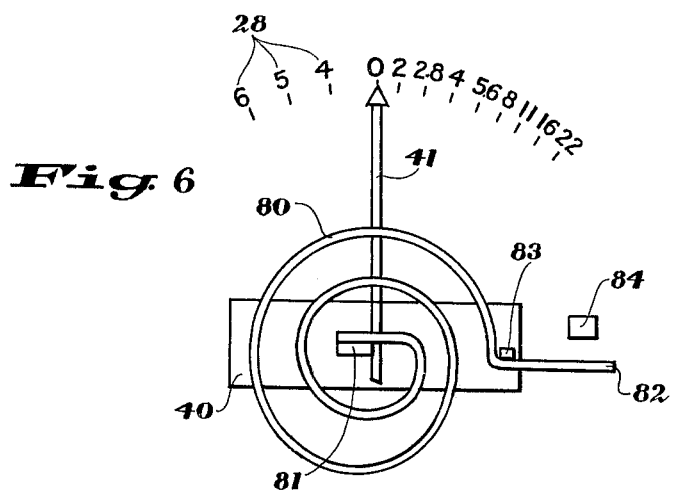

United States Patent Office 3,227,057
Patented Jan. 4, 1966

3,227,057
CAMERA BATTERY TEST INDICATOR
Allen G. Stimson and Raymond E. Unterborn, Rochester, N.Y., assignors to Eastman Kodak Company, Rochester, N.Y., a corporation of New Jersey
Continuation of application Ser. No. 265,760, Mar. 18, 1963. This application Dec. 14, 1964, Ser. No. 420,246
5 Claims. (Cl. 95—10)

This application is a continuation of our copending application, Serial No. 265,760, filed March 18, 1963, now abandoned.

The present invention relates to a dual functioning of an electric measuring instrument in a camera's exposure control system, and more particularly to means whereby such electrical measuring instrument may be used for indicating unambiguously either the electrical potential available from a camera battery or a function of scene light as sensed by a photoresponsive device.

In a co-pending application, Serial No. 265,673, of one of the present inventors, a system of this same general type is disclosed and claimed wherein the electrical measuring instrument normally used for indicating the illumination conditions is effectively disconnected from the photoresponsive device when used to indicate the battery potential.

One of the objects of this invention is to indicate the potential difference across a camera battery by means of the electric measuring instrument which normally functions in the camera's exposure control system for indicating scene light without disturbing the electrical connections in such control system.

A further object of the invention is to thus indicate battery potential on a scale separate from the scale for indicating a function of scene light, each scale cooperating with the same electric measuring instrument but arranged so as to keep the indications distinct and unambiguous.

These and other objects of the invention are accomplished by connecting a camera's photoresponsively controlled electrical measuring instrument selectively across the camera's battery without disconnecting it from its photoresponsive device. With respect to the instrument, the polarity of the photoresponsive device is opposite to that of the battery with the result that the instrument's moving member deflects in opposite directions from a reference point with respect to the two connections. Scale indicia cooperating with the moving member are arranged for indicating battery potential when the member deflects in one direction from the reference point, and indicating a function of scene light when the member deflects in the other direction from the reference point. Thus, the two indicating functions of the instrument are kept separate and clearly readable, so as to avoid any ambiguity.

The invention will be better understood by reference to the drawings wherein.

Figure 1:
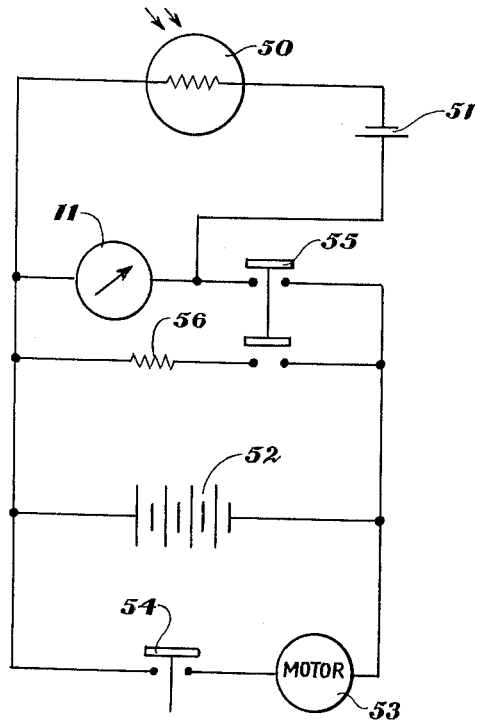
FIG. 1 shows a schematic circuit diagram of an embodiment of the invention.

An electric circuit for accomplishing the invention is shown in FIG. 1. Such a circuit allows testing of a battery without disconnecting the photoresponsive element from the electric measuring instrument, because current through the instrument in response to battery voltage is of sufficient relative magnitude to overpower current in response to illumination of the photocell.

A photoconductive cell 50 powered by battery 51 is connected across electric measuring instrument 11. A camera drive battery 52 electrically connected with camera drive motor 53 is arranged for powering motor 53 upon closing of switch 54. To test the voltage of battery 52, switch 55 is closed so as to connect the battery across instrument 11 and resistor 56 which simulates the electrical load of motor 53. Since camera battery testing is not undertaken while drive motor 53 is operating, switch 54 is open. The polarity of batteries 51 and 52 with respect to instrument 11 is opposed so as to produce respectively opposite deflections of the instrument's movable member.

In a typical exposure control system employing a photoconductive cell such as cell 50, currents through instrument 11 in response to illumination of cell 50 are in the microampere range, for example, 200–300 microamperes. The movable coils of electric measuring instruments commonly used in exposure control systems can accommodate much larger currents without damage to the instrument. Accordingly, current through instrument 11 in response to the voltage of battery 52 is arranged to fall in the milliampere range, for example, 1–2 milliamperes, and can be even higher. Thus, the deflecting torque of instrument 11 in response to a test of the voltage of battery 52 is many times as great as the opposite deflecting torque in response to illumination of cell 50 so that varying levels of illumination of cell 50 play a very insignificant part in the total instrument deflection, and the electric signal in response to battery 52 overpowers the electric signal in response to cell 50. Utilization of such a comparatively more powerful deflecting torque during battery testing enables a battery test to be accomplished without disconnecting cell 50 from instrument 11. This eliminates a set of switch contacts which would otherwise be provided and also enables use of a variety of deflection resisting torque means, such as those shown in FIGS. 2–6, for varying the scale characteristics of the instrument for battery test deflection.

Figure 2:
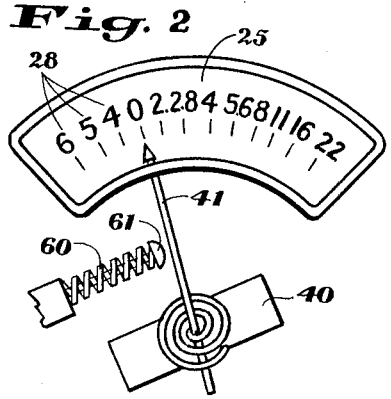
FIGS. 2–4 show front and side views of spring arrangements for resisting deflection of a movable member of an electric instrument in response to a test of battery voltage.

FIG. 2 shows a deflection resistant spiral spring 60 having a contact tip 61 for engaging pointer 41 which is fastened to coil 40 of electric measuring instrument 11. Coil 40 is arranged in circuit with battery 52 (FIG. 5) for deflecting counterclockwise in response to battery voltage. Such deflection moves pointer 41 over battery voltage indicia 28 of scale 25.

Figure 3:
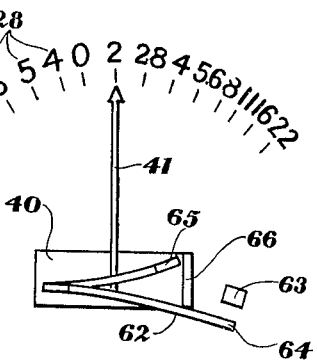
Figure 4:
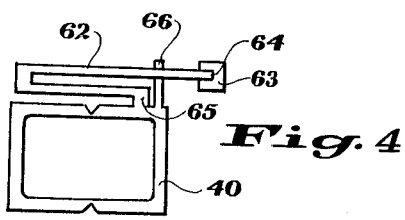

FIGS. 3 and 4 show another spring arrangement for resisting deflection in response to a test of battery voltage. Cantilever spring 62 has a fixed end 65 fastened to coil 40 and a free end 64. The effective length of spring 62 is increased by its having two arms doubling back on one another. Spring 62 is biased to rest against stop 66 which is fastened to coil 40. Spring 62 resists counterclockwise deflection of coil 40 in response to battery voltage for moving pointer 41 over battery voltage indicia scale 28, because its free end 64 is arranged for engaging the abutment 63 which is fixed to the camera.

In FIG. 5 is shown a helical or spiral spring 70 having a fixed end mounted on support 71 which is fastened to the camera body and a free end 72 formed as a pointer. The bias of spring 70 is such that the free end 72 rests against stop 73. A downwardly extending projection 74 formed on pointer 41, which is fastened to movable coil 40, is arranged for engaging spring 70 upon deflection of coil 40 in a counterclockwise direction in response to a battery voltage test. Pointer 41 is arranged to pass freely over spring 70, which is engaged only by downwardly projecting member 74. Thus, counterclockwise deflection of coil 40 in response to a battery voltage test causes projection 74 to drive the pointer end 72 of spring 70 across battery voltage indicia scale 28 to an extent dependent upon battery voltage.

FIG. 6 shows a helical or spiral spring 80 having its innermost end fixed to support 81 which is mounted on coil 40. The free end 82 of spring 80 extends beyond limit stop 83 fixed to coil 40, and is arranged for engaging abutment 84 fixed to the camera body when coil 40 deflects counterclockwise in response to a test of battery voltage. Spring 80 thus resists such deflection and causes pointer 41 to be positioned on battery voltage scale 28 in accordance with battery voltage.

The invention has been described in detail with particular reference to preferred embodiments thereof, but it will be understood that variations and modifications can be effected within the spirit and scope of the invention as described hereinabove and as defined in the appended claims.

We claim:

1. In a photographic camera having a source of electric potential, the combination comprising:
    an electric measuring instrument having
      a coil,
      a member deflectable in two opposite directions from a predetermined reference position,
      and first spring means for resiliently resisting deflection of said member in one of said directions from said reference position;
    closed circuit means independent of said potential source and including said coil and a photoresponsive element illuminatable by scene light for normally causing current to flow through said coil in such sense as to cause deflection of said member in said one direction, against the resistance of said first spring means, and in accordance with the degree of illumination on said photoresponsive element;
    means including a manually actuatable switch operable, when said switch is actuated, to connect said source of electric potential in circuit with said coil, without opening said closed circuit, so as to buck and overcome the normal current flow therethrough produced by said first closed circuit and to produce a resultant current flow through said coil in the opposite sense whereby to cause deflection of said member in the other direction from said reference position;
    and second spring means, stronger than said first spring means, for resisting such deflection of said member in said other direction from said reference position.

2. The combination of claim 1 wherein said camera has a pointer and scale one of which is movable with said member, said scale having a first portion for indicating an exposure value corresponding to said first direction deflection and second portion for indicating a condition of voltage of said source corresponding to said second direction deflection.

3. The combination of claim 1 wherein said second spring means comprises a spiral spring having an inner end fixed to said camera and a movable outer end; means movable with said member and arranged for engaging said spiral spring during said second direction deflection for moving said movable end; and scale means cooperable with said movable end for indicating the voltage of said source.

4. The combination of claim 1 wherein said second spring means comprises a spiral spring having an inner end fixed to said movable member and a movable outer end; and abutment means fixed to said camera for engaging said outer end during said second direction deflection.

5. The combination of claim 1 wherein said second spring means comprises a cantilever spring having an end fixed to said movable member and a movable end; and abutment means fixed to said camera for engaging said movable end during said second direction deflection.

References Cited by the Examiner

FOREIGN PATENTS 1,056,470  4/1959  Germany.

NORTON ANSHER, *Primary Examiner*.